United States Patent [19]
Bordovsky

[11] Patent Number: 5,864,431
[45] Date of Patent: Jan. 26, 1999

[54] METHOD AND APPARATUS FOR ELIMINATION OF DISTORTION IN REAR PROJECTION TO CURVED SURFACES

[75] Inventor: Robert D. Bordovsky, Arlington, Tex.

[73] Assignee: Redifun Stimulation, Inc., Southlake, Tex.

[21] Appl. No.: 888,661

[22] Filed: Jul. 7, 1997

[51] Int. Cl.$^6$ .................................................. G02B 27/14
[52] U.S. Cl. ............................................. 359/630; 359/637
[58] Field of Search .................................. 359/618, 630, 359/631, 456, 457, 460, 637

[56] References Cited

U.S. PATENT DOCUMENTS

| | | | |
|---|---|---|---|
| 3,443,858 | 5/1969 | La Russa | 350/157 |
| 3,868,173 | 2/1975 | Miles et al. | 359/823 |
| 3,998,532 | 12/1976 | Dykes | 359/731 |
| 4,293,196 | 10/1981 | Hilbert | 359/743 |
| 4,743,200 | 5/1988 | Welch et al. | 434/43 |
| 5,004,331 | 4/1991 | Haseltine et al. | 359/728 |
| 5,394,198 | 2/1995 | Janow | 348/744 |
| 5,572,229 | 11/1996 | Fisher | 345/8 |
| 5,572,363 | 11/1996 | Fergason | 359/630 |
| 5,695,406 | 12/1997 | Park | 472/61 |

OTHER PUBLICATIONS

"The Flostation" circular, Flogiston Corporation, date unknown.

*Primary Examiner*—Georgia Epps
*Assistant Examiner*—Ricky Mack
*Attorney, Agent, or Firm*—Dan Venglarik

[57] ABSTRACT

A display system employs rear projection to a curved, translucent display or image screen. A lens between the projecting device and the display screen eliminates or reduces distortion by altering a convergence of the projected image, transforming the projected image from diverging to converging for a convex rear projection screen surface or further diverging the image for a concave rear projection screen surface. A lightweight and economical Fresnel lens may be employed for this purpose.

16 Claims, 6 Drawing Sheets

METHOD AND APPARATUS FOR ELIMINATION OF DISTORTION IN REAR PROJECTION TO CURVED SURFACES

BACKGROUND OF THE INVENTION

1. Technical Field

The present invention relates generally to display devices for data processing systems and in particular to rear projection display devices. Still more particularly, the present invention relates to rear projection display devices employing curved translucent projection screens.

2. Description of the Related Art

A variety of contemporary devices require or benefit from display systems which occupy the field of vision of a user, either completely or in a substantial portion. In general, display devices designed to occupy the most significant majority of a user's field of vision may be loosely referred to a "full field" display device. Examples of such devices include flight simulators, whether utilized for training or for entertainment, and other environment simulators. Wrap-around or large, collimated display systems occupying the user's field of vision in such devices reduce a user's awareness of the actual surroundings and increase the user's awareness of the simulated environment.

An economical approach to full field display systems employs rear projection to a translucent display screen. One implementation of this approach is depicted in FIG. 5. The display system 502 includes a plurality of flat display screens 504–508 arranged to surround the focal point 510 of a user's field of vision. Each display screen 504–508 has an associated projection device 512–516 projecting a portion of the total image. This arrangement requires complex adaptations for image splitting and edge matching of the individual image portions. The boundaries between the separate image portions cannot be completely concealed from the user, and differences in distance to the image may be perceptible to the user.

An alternative implementation of the rear projection approach to full field display systems is depicted in FIG. 6. Display system 602 employs a curved display screen 604, a bubble which is nearly hemispherical. A single projection device 606 projects the complete image onto the screen 604. However, the projected image as it appears on screen 604 is distorted, which is minimal in a central region 608 and becomes increasingly distorted near outer edges 610 of screen 604. Therefore, complex image warping adaptations are required to offset the image distortion.

It is desirable, therefore, to provide a full field display system which does not require complex image management adaptations. It would further be advantageous if the full field display system employed rear projection to a curved display screen without significant image distortion.

SUMMARY OF THE INVENTION

A display system employs rear projection to a curved, translucent display or image screen. A lens between the projecting device and the display screen eliminates or reduces distortion by altering a convergence of the projected image, transforming the projected image from diverging to converging for a convex rear projection screen surface or further diverging the image for a concave rear projection screen surface. A lightweight and economical Fresnel lens may be employed for this purpose.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
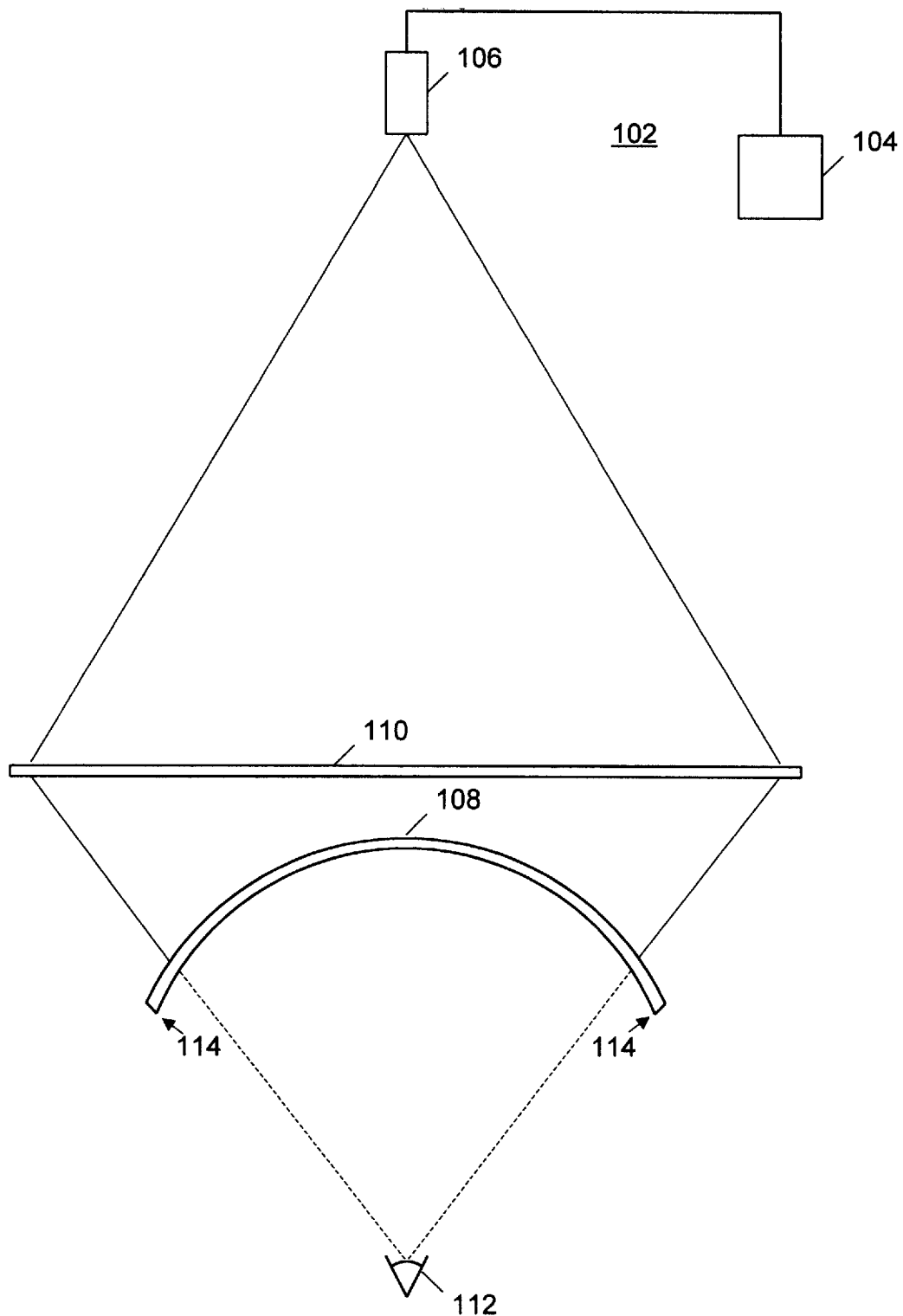
FIG. 1 depicts a simulator employing a full field display system in accordance with a preferred embodiment of the present invention.

With reference now to the figures, and in particular with reference to FIG. 1, a simulator employing a full field display system in accordance with a preferred embodiment of the present invention is depicted. Although a simulator is depicted for the purposes of describing the invention, other devices may employ the full field display system of the invention.

Simulator 102 in the exemplary embodiment includes a data processing system 104 generating the simulated or gaming environment, providing the image to be displayed and responding to user input. Data processing system 104 may be a general purpose computer executing a simulation program or a dedicated data processing system for running a simulation program. In the exemplary embodiment, data processing system 104 is a general purpose data processing system running a flight simulation program. Data processing system 104 generates image data and is connected to projection device 106, which projects the image data onto display screen 108. Projection device 106 may be a liquid crystal display (LCD) projection device such as are available from various commercial sources, including, for example, the Sharp XGNV1U Notevision Projector available from Sharp Corporation.

Display screen 108 comprises an acrylic or polycarbonate translucent material such as is conventionally employed in rear projection systems. However, display screen 108 is curved, forming a surface having a nearly hemispherical geometry. Display screen 108 may thus wrap around a user, filling the user's field of vision. Projecting device 106 is situated to project an image onto the outer surface of display screen 108, or the surface having the largest radius. The image passes through translucent display screen 108 and is viewed by a user as originating from the inner surface of display screen 108.

Disposed between projection device 106 and display screen 108 is a lens 110. Lens 110 alters a convergence of the projected image, transforming the image projected by projection device 106 from diverging to converging. Ideally, the projected image passing through lens 110 converges toward the focal point 112 of the user's field of vision. However, spatial limitations and the refractive index of lens 110 may prevent this from being achieved. Nonetheless, an arrangement achieving as close to the ideal case as possible given spatial limitations and the properties of lens 110 may reduce image distortion on display screen 106 to acceptable levels. The worst distortion will occur at the edges 114 of display screen 110, corresponding to the periphery of the user's field of vision.

In the depicted embodiment, display screen 106 may have a radius of approximately 14 inches, while lens 110 may have a diameter of approximately 38 inches. Projection device 106 may then be situated about 100 inches from the focal point of the user 112.

A lightweight, economical implementation of lens 110 is a Fresnel lens, a plastic lens having concentric grooves on one surface to achieve a refractive index. The grooved surface of the Fresnel lens may face either the projection device or the display screen. In this application, the grooved surface may face the display screen to minimize secondary reflection effects.

Figure 6:
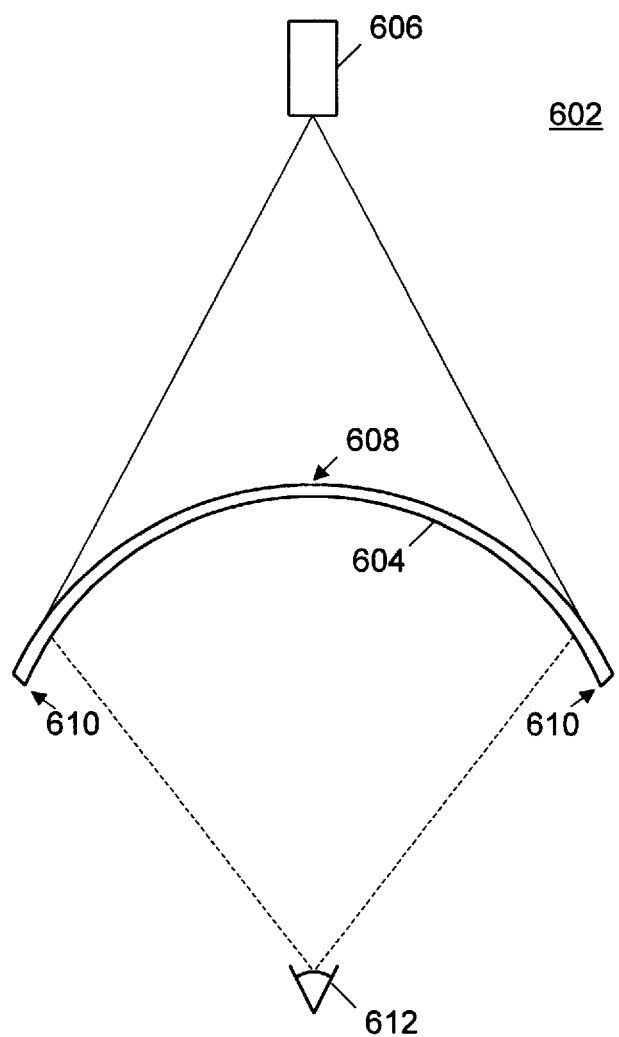

The present invention eliminates most distortion in rear projection of an image to a curved display screen for a full field display system. A lightweight and economical implementation of the present invention utilizes a Fresnel lens to transform the projected image from diverging to converging for display on a translucent display screen. The lens also corrects depth of field problems associated with the prior art arrangement depicted in FIG. 6.

Figure 2A:
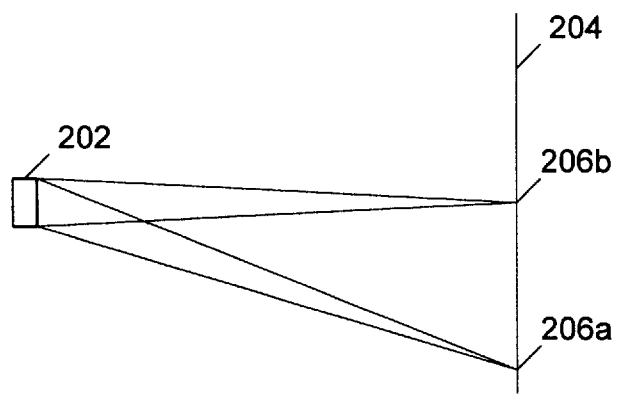
FIGS. 2A–2C are comparative diagrams of the depth of field in prior art rear projection display systems and a display system in accordance with a preferred embodiment of the present invention.
Figure 2B:
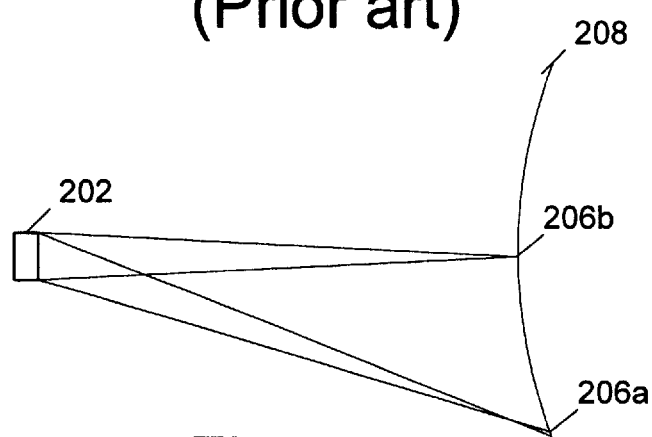
Figure 2C:
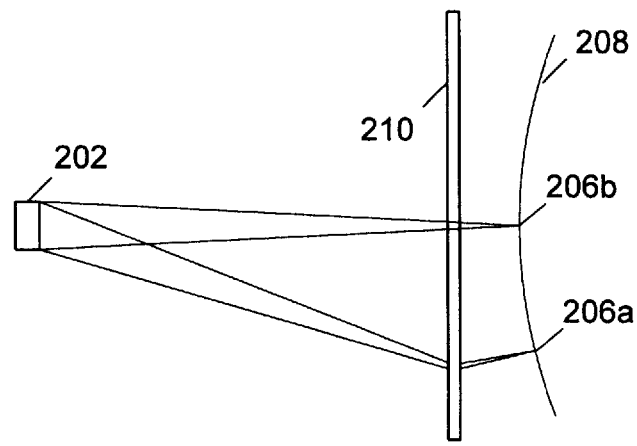

Referring to FIGS. 2A–2C, comparative diagrams of the depth of field in prior art rear projection display systems and a display system in accordance with a preferred embodiment of the present invention are illustrated. FIG. 2A depicts projection from a standard projection device lens 202 to a flat display screen 204. The depth of field is uniform, so that image data at a peripheral region 206a of display screen 204 is in focus at the same time that image data at a central region 206b of display screen 204 is in focus.

FIG. 2B depicts prior art projection to a curved display screen 208. Because the depth of field varies, when image data at a central region 206b of display screen 208 is in focus, image data at a peripheral region 206a of display screen 208 exhibits degraded focus.

FIG. 2C illustrates correction of the depth of field problem by the present invention. Lens 210 alters the focal point of image data projected toward a peripheral region 206a of curved display screen 208, so that image data at the peripheral region 206a is in focus simultaneously with image data at a central region 206b of display screen 208.

Figure 3:
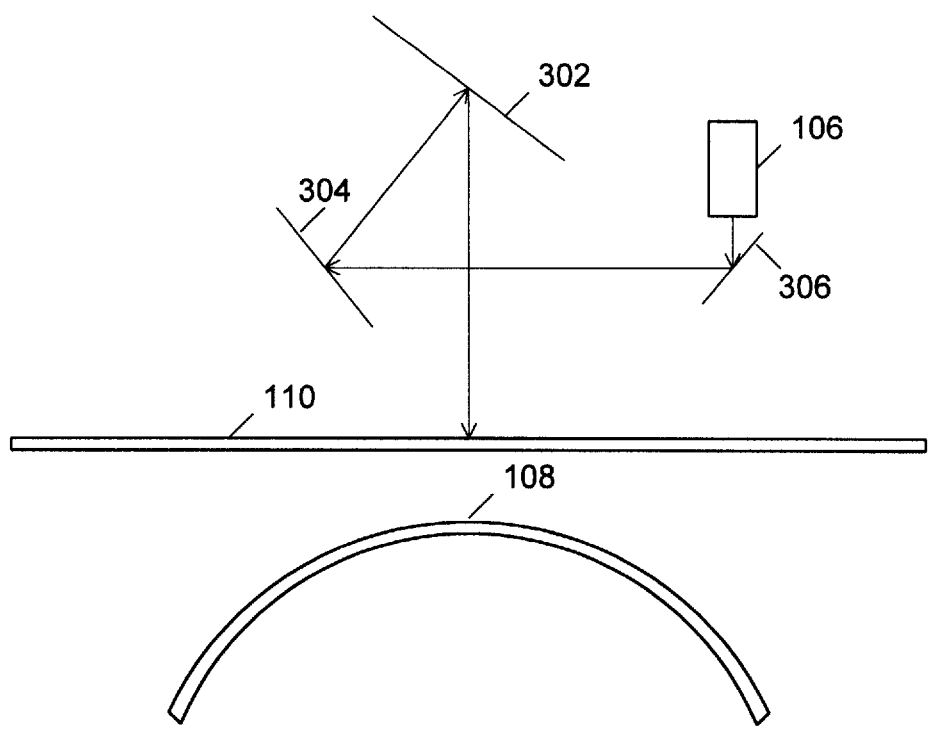
FIG. 3 depicts an alternative embodiment of a rear projection display system in accordance with a preferred embodiment of the present invention.

With reference now to FIG. 3, an alternative embodiment of a rear projection display system in accordance with a preferred embodiment of the present invention is depicted. The alternative embodiment depicts the use of fold mirrors 302, 304, and 306 to shorten the distance required between the projection device 106 and screen 108. Although the depicted example employs three fold mirrors, one or two suitably arranged fold mirrors may also be employed.

Figure 4:
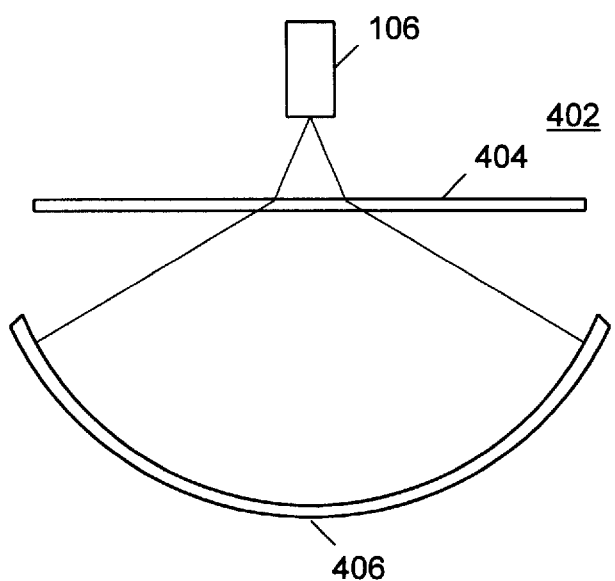
FIG. 4 is another alternative embodiment of a rear projection display system in accordance with a preferred embodiment of the present invention.
Figure 5:
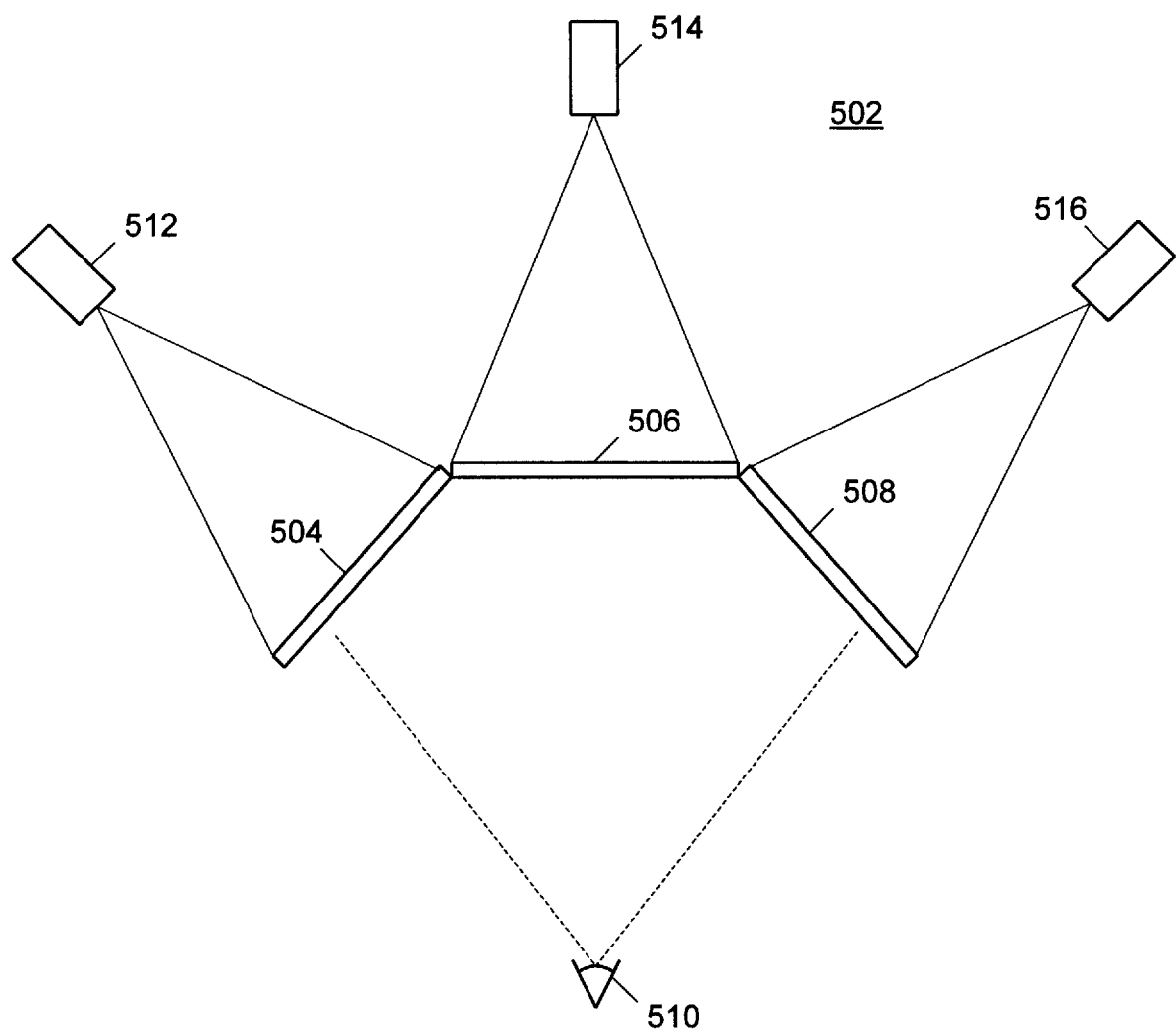
FIGS. 5–6 are prior art implementations of full field display systems.

With reference now to FIG. 4, another alternative embodiment of a rear projection display system in accordance with a preferred embodiment of the present invention is depicted. Display system 402 employs projection device 106 for projecting an image to display screen 406. Unlike the display screens depicted in previous embodiments of the present invention, for which the convex surface faces the projection device and the image was viewed from the concave side, the concave surface of display screen 406 faces projection device 106, and the image is intended to be viewed from the convex side. Therefore, as depicted, lens 404 alters the convergence of the projected image by increasing the divergence of the projected image. Stated differently, where the lens in other embodiments depicted herein is selected to increase the convergence of the projected image, the lens depicted in the embodiment of FIG. 4 decreases the convergence of the projected image.

The present invention eliminates distortion in rear projection to curved display surfaces by altering a convergence of the projected image. The same mechanism employed to eliminate distortion—a lens altering convergence of the projected image—also corrects for variable depth of field problems, eliminating degraded focus at peripheral regions of the display surface.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A full field display system, comprising:
    a curved rear-projection display screen having a viewing surface opposite a projection surface, wherein the viewing surface faces a user field of view;
    an image projection device projecting a focused image onto the projection surface of the curved display screen, wherein the projected image is visible in the user field of view from the viewing surface; and
    a lens disposed between the curved display screen and the image projection device, the projected image passing through and predistorted by the lens to reduce distortion of the projected image seen from the user field of view at a peripheral portion of the display screen.

2. The full field display system of claim 1, wherein the lens alters a convergence of a first portion of the projected image at the projection surface of the display screen differently than the lens alters a convergence of a second portion of the projected image.

3. The full field display system of claim 2, wherein the lens transforms the first portion of the projected image from diverging to converging.

4. The full field display system of claim 2, wherein the lens increases a divergence of the first portion of the projected image.

5. The full field display system of claim 1, wherein the projected image converges toward a focal point of the user field of view after passing through the lens.

6. The full field display system of claim 1, wherein the lens further comprises a Fresnel lens.

7. The full field display system of claim 1, wherein the display screen comprises a translucent display screen substantially filling the user field of view.

8. The full field display system of claim 1, wherein the projection surface of the display screen is convex.

9. The full field display system of claim 1, wherein the projection surface of the display screen is concave.

10. A simulator, comprising:
    a data processing system generating image data;
    a projection device receiving the image data and projecting an image onto a projection surface of a curved display screen wherein the projected image is visible on a viewing surface opposite the projection surface; and
    a lens disposed between the projection device and the curved display screen, the lens altering a convergence of a first portion of the projected image at the projection surface by a first amount and altering a convergence of a second portion of the projected image at the projection surface by a second amount different from the first amount to eliminate distortion of the projected image on a peripheral portion of the display screen.

11. The simulator of claim 10, wherein the data processing system comprises a general purpose data processing system running a simulation program.

12. The simulator of claim 10, wherein the projection device comprises a liquid crystal display projection device.

13. The simulator of claim 10, wherein a convex surface of the curved display screen faces the projection device.

14. The simulator of claim 13, wherein the lens increases the convergence of the first portion of the projected image to be greater than the convergence of the second portion.

15. The simulator of claim 10, wherein a concave surface of the curved display screen faces the projection device.

16. The simulator of claim 15, wherein the lens decreases the convergence of the first portion of the projected image without decreasing the convergence of the second portion.

* * * * *